(12) United States Patent
Hughes et al.

(10) Patent No.: US 10,025,482 B2
(45) Date of Patent: *Jul. 17, 2018

(54) IMAGE EFFECT EXTRACTION

(71) Applicant: Adobe Systems Incorporated, San Jose, CA (US)

(72) Inventors: Bryan O'Neil Hughes, Ben Lomond, CA (US); David Howe, San Francisco, CA (US); Jon Clauson, Rogers, MN (US); Lance Lewis, San Ramon, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,380

(22) Filed: May 4, 2017

(65) Prior Publication Data

US 2017/0235476 A1 Aug. 17, 2017

Related U.S. Application Data

(63) Continuation of application No. 13/900,789, filed on May 23, 2013, now Pat. No. 9,672,647.

(51) Int. Cl.
*G06F 3/0484* (2013.01)
*G06F 3/0482* (2013.01)
(Continued)

(52) U.S. Cl.
CPC ........ *G06F 3/04847* (2013.01); *G06F 3/0482* (2013.01); *G06T 5/006* (2013.01);
(Continued)

(58) Field of Classification Search
CPC ......... G06T 11/60; G06T 5/006; H04N 1/387; H04N 9/3185; H04N 1/00209; H04N 1/00244; G06F 3/04847; G06F 3/0482
See application file for complete search history.

(56) References Cited

U.S. PATENT DOCUMENTS 5,757,379 A 5/1998 Saito
5,974,198 A 10/1999 Hamburg
(Continued)

OTHER PUBLICATIONS

McCann, "Combined Search and Examination Report under Sections 17 and 18(3)", UK Intellectual Property Office, UK Patent Application GB1408848.8 (dated Nov. 11, 2014).

*Primary Examiner* — Jwalant Amin
(74) *Attorney, Agent, or Firm* — Finch & Maloney PLLC

(57) ABSTRACT

Techniques are disclosed for facilitating the sharing of digital imaging effects from an image originator to an image recipient. A digital imaging effect is the result of a processing technique that is applied to a digital image in a way that produces a particular visual effect. The processing techniques that underlie digital imaging effects such as these can be defined by parameters that establish how the individual pixels comprising the image are manipulated to achieve the desired visual effect. In certain embodiments such defining parameters can be incorporated into a digital image file that thus contains not only data defining the image itself, but also parameters that define one or more effects that may have been applied to the image. This advantageously allows a recipient of the digital image file to not only view the image, but also to use the incorporated parameters to apply the effect to other images.

20 Claims, 8 Drawing Sheets

(51) Int. Cl.
*H04N 1/00* (2006.01)
*G06T 11/60* (2006.01)
*G06T 5/00* (2006.01)
*H04N 9/31* (2006.01)
*H04N 1/387* (2006.01)

(52) U.S. Cl.
CPC .......... *G06T 11/60* (2013.01); *H04N 1/00209* (2013.01); *H04N 1/00244* (2013.01); *H04N 1/387* (2013.01); *H04N 9/3185* (2013.01)

(56) References Cited

U.S. PATENT DOCUMENTS

| | | |
|---|---|---|
| 6,057,935 A | 5/2000 | Freeman |
| 6,208,351 B1 | 3/2001 | Borg |
| 6,557,017 B1 | 4/2003 | Venable |
| 6,621,504 B1 | 9/2003 | Nadas |
| 6,774,907 B1 | 8/2004 | Gupta |
| 6,862,102 B1 | 3/2005 | Meisner |
| 7,062,107 B1 | 6/2006 | Crosby |
| 7,071,948 B2 | 7/2006 | Wilensky |
| 7,159,008 B1 | 1/2007 | Wies |
| 7,194,680 B1 | 3/2007 | Roy |
| 7,466,868 B2 | 12/2008 | Wilensky |
| 8,145,600 B1 | 3/2012 | Lewis |
| 8,208,762 B1 | 6/2012 | Berger |
| 8,245,124 B1 | 8/2012 | Gupta |
| 8,315,652 B2 | 11/2012 | Grant |
| 2004/0133924 A1 | 7/2004 | Wilkins |
| 2009/0124345 A1 | 5/2009 | Gilmore |
| 2009/0210799 A1 | 8/2009 | Reiser |
| 2009/0217352 A1 | 8/2009 | Shen |
| 2012/0230609 A1 | 9/2012 | Fuchs |

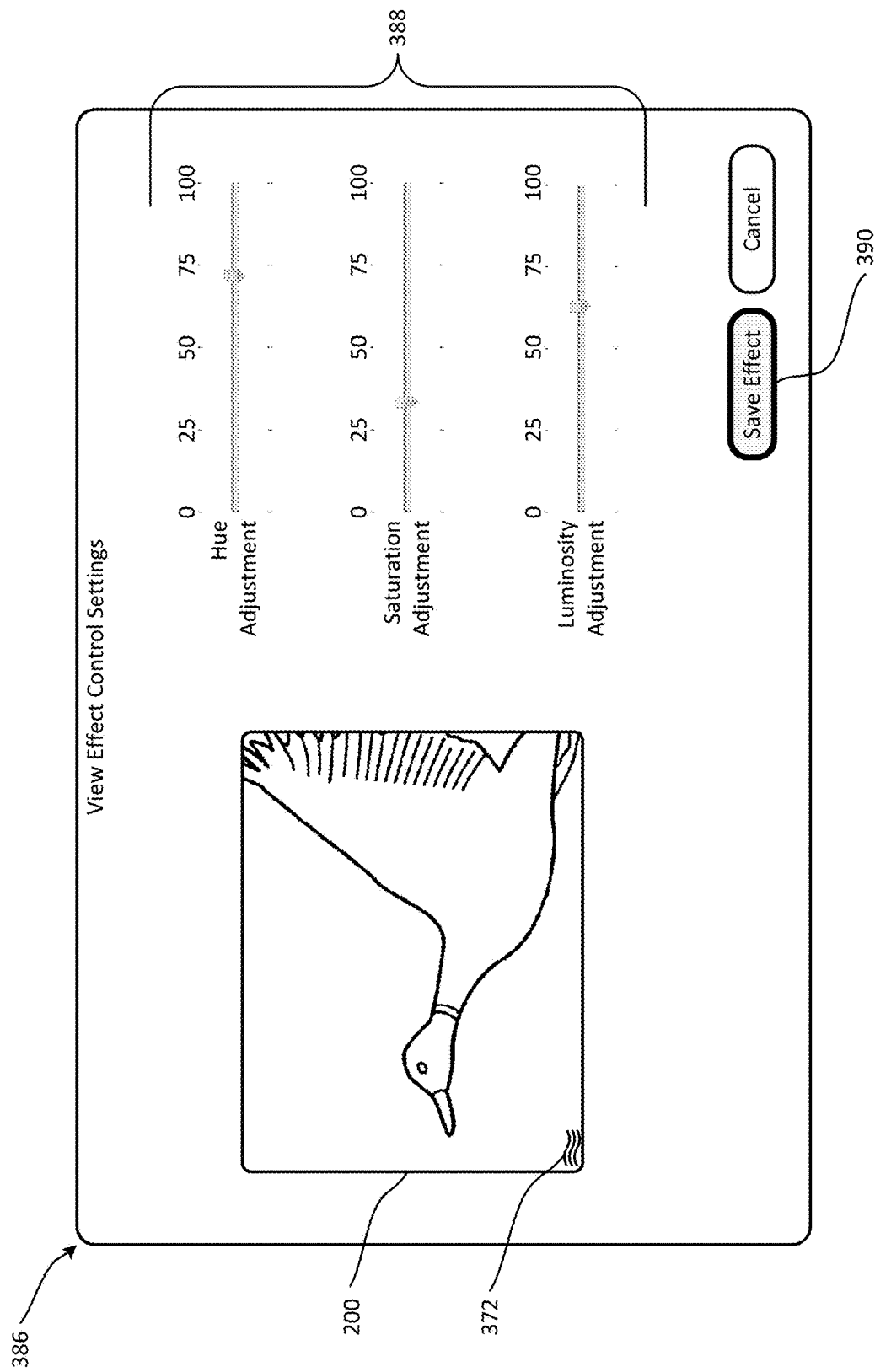

IMAGE EFFECT EXTRACTION

CROSS REFERENCE TO RELATED APPLICATIONS

This application is a continuation of U.S. patent application Ser. No. 13/900,789 (filed 23 May 2013), the entire disclosure of which is hereby incorporated by reference herein.

FIELD OF THE DISCLOSURE

This disclosure relates generally to digital image processing, and more specifically to techniques for sharing descriptive properties of post-production effects that have been applied to a digital image.

BACKGROUND

Graphic illustrations are frequently used to communicate information. With the widespread availability of digital computers, scanners and cameras, the process of creating graphic illustrations has expanded from manual artistic or photographic techniques to also include computer-aided techniques. As a result, a wide variety of software applications have been developed to facilitate the process of creating, modifying and otherwise manipulating digital images. For example, software applications such as presentation, animation, painting and design applications allow users to apply a wide range of predefined processing techniques to a digital image. During such digital image processing, graphical attributes of the individual picture elements ("pixels") that comprise the image can be adjusted in a way that produces a desired visual effect.

BRIEF DESCRIPTION OF THE DRAWINGS

FIG. 3F illustrates an example user interface that can be used to view and/or manipulate control settings associated with a digital imaging effect in accordance with certain embodiments of the present invention.

DETAILED DESCRIPTION

Figure 1:
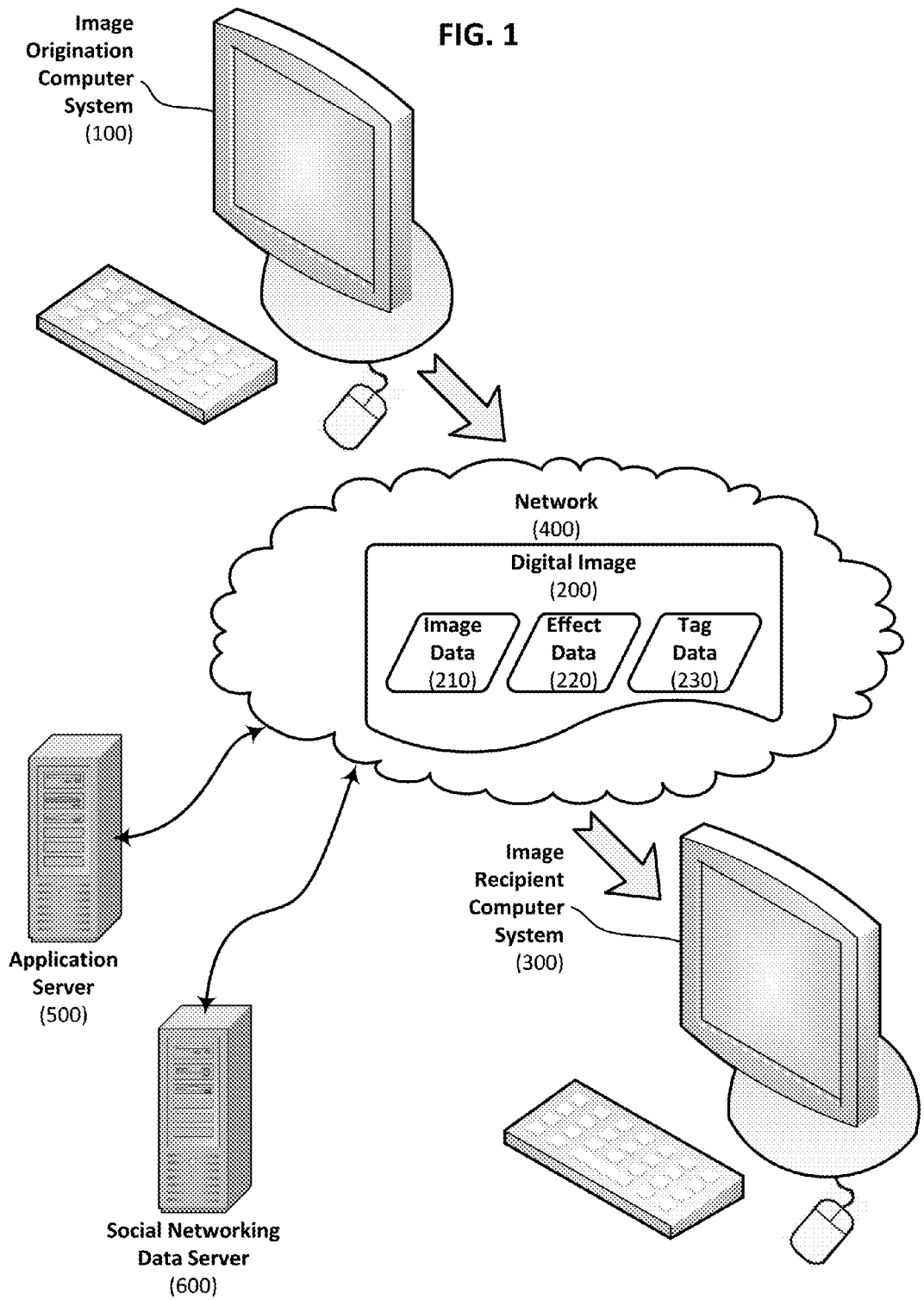
FIG. 1 schematically illustrates selected components of a system that can be used in certain embodiments of the present invention to share a digital imaging effect between an image originator and an image recipient.

Techniques are disclosed for facilitating the sharing of digital imaging effects from an image originator to an image recipient. A digital imaging effect is the result of a processing technique that is applied to a digital image in a way that produces a particular visual effect. For example, a motion blur effect can be applied to an image to give the impression of movement in a still image, or a brightness manipulation effect can be used to darken an otherwise overexposed image. The processing techniques that underlie digital imaging effects such as these can be defined by parameters that establish how the individual pixels comprising the image are manipulated to achieve the desired visual effect. In accordance with an embodiment of the present invention, such defining parameters can be incorporated into a digital image file that contains not only data defining the image itself, but also parameters that define one or more effects that may have been applied to the image. This advantageously allows a recipient of the digital image file to not only view the image, but also to use the incorporated parameters to apply the effect to other images to achieve a similar overall look and feel.

General Overview

Modern digital image processing software has become increasingly powerful and feature-laden. Advances in such software have been supported by corresponding advances in the capacity of graphics processors to manipulate and display high resolution digital imagery efficiently. A modern digital image processing software tool may provide a user with access to hundreds or even thousands of different digital imaging effects which can be applied to an image. Examples of such effects may range from relatively straightforward brightness, hue or sharpening effects that are applied uniformly across an entire image, to advanced blurring, warping or filtering effects which are selectively applied to portions of an image, possibly based on one or more user-defined parameters. While such digital image manipulation tools are extremely powerful, they can also be complicated and/or difficult to use, especially for novice users. As a consequence, many such systems require users to have a high degree of artistic ability and computer proficiency to take full advantage of their functionality. Seeing a beautifully retouched image may provide the viewer with an idea of how powerful an image processing tool is, but generally provides no insight with respect to how to accomplish such processing. Thus, users of such systems may have to spend hours or days watching tutorial videos, attending classes or workshops, or otherwise training with the system before being able to fully understand the mechanics of how to create a given effect. This evidences a significant disconnect between processing ability and ease-of-use.

Thus, and in accordance with certain embodiments of the present invention, techniques are provided herein that facilitate the sharing of digital imaging effects from an image originator to an image recipient. In such embodiments, a digital image file contains not only the data defining the image itself, but also parameters that define one or more effects that may have been applied to the image. In a more general sense, parameters defining the one or more effects applied to the image are associated with the digital image file and can travel with that image file, for example as another file or data embedded within the image file itself. This allows a recipient of the digital image file to not only view the image, but also to use the incorporated parameters to apply the effect to other images. This helps the image recipient learn how a particular visual effect can be achieved and allows the image creator to share his/her digital image processing knowledge with others. For example, this allows artists to broadcast how a given effect is accomplished by simply sharing their work with others, thereby enabling such effects to be extracted and re-purposed. Furthermore, given the ease and popularity of photo sharing, incorporating effect data into digital image files serves to increase awareness of the capabilities of a particular digital imaging processing tool, thereby allowing purveyors of such tools to leverage the power of social networking tools used to share such images. Thus an image can be used to market the application used to create the image.

For example, certain embodiments provide the ability to extract the digitally processed look of a received image—referred to herein as an "imaging effect" or a "digital imaging effect"—simply by clicking on or otherwise selecting an indicator icon associated with that image. Upon selecting the indicator icon, the image recipient can apply that same imaging effect to another target image. The image recipient may also save effect data that defines the imaging effect for future use. In some cases the digital image processing application originally used by the image originator to generate the effect is also used by the image recipient to apply the effect to the target image. In one such embodiment, the effects extracted from a given image can be applied to the target image and a user interface control feature corresponding to each effect can be presented to the image recipient. In this way, the user can associate a visually-appealing effect with one or more specific user interface control feature settings. Where the image recipient does not have access to that application, selecting the indicator icon can redirect the image recipient to an application server that can provide the application or a trial version of the application. This advantageously allows features of the digital image processing application to travel with the images generated by such application, thereby spreading the reach and awareness of the digital image processing application itself. Because images rapidly spread through existing social networks, this ability to bundle an application with the images produced by the application is a particularly powerful tool for increasing awareness of the digital image processing application itself.

The various embodiments disclosed herein can be implemented in various forms of hardware, software, firmware and/or special purpose processors. For example, in one embodiment a non-transient computer readable medium has instructions encoded thereon that, when executed by one or more processors, cause at least a portion of one or more of the digital image effect sharing methodologies disclosed herein to be implemented. Such a computer readable medium can be provided in the form of a computer software application or applet that is tangibly embodied on a memory device, and that can be executed by a computer or computers having any suitable architecture. In certain embodiments the computer software application is specifically designed for the manipulation of artwork such as digital images and graphics, although in other embodiments the functionalities disclosed herein can be incorporated into other software applications, such as video editing applications, desktop publishing applications, or other content generation and modification applications. The aforementioned computer software application may include a number of different modules, sub-modules or other components of distinct functionality that can provide information to, or receive information from, other components. These modules can be used, for example, communicate with input and output devices such as pointing devices, display screens, touchscreens and/or other user interface devices. For instance, certain embodiments include an application user interface having an effect selection tool that allows an image originator to select which effects are to be shared via a digital image file. Certain embodiments may additionally or alternatively include an application user interface that allows an image recipient to apply a digital image effect to an existing image or to save a digital image effect for future use.

For example, FIG. 1 schematically illustrates selected components of a system that can be used in certain embodiments of the present invention to share a digital imaging effect between an image originator and an image recipient. As illustrated, the image originator can be understood as using image origination computer system 100, while the image recipient can be understood as using image recipient computer system 300. Digital image 200 is communicated from the image originator to the image recipient via network 400. Other computer systems are optionally connected to network 400, such as application server 500 and/or social networking data server 600. The functionality of these various components will be described in turn, although it will be appreciated that other embodiments may include additional or fewer components, and that the claimed invention is not intended to be limited to any particular set of components or hardware configuration.

Still referring to the example embodiment illustrated in FIG. 1, the digital image 200 may include one or more of image data 210, effect data 220 and/or tag data 230. These data that comprise digital image 200 may be incorporated into a single image file, or may be provided in separate files which are collected together in a data structure such as a folder or a compressed folder. In other embodiments, these data may be provided in separate files which are not collected together in any particular data structure, but that are nevertheless processed as a group or in similar fashion based on the data processing methodologies disclosed herein. Additional data types and/or structures beyond those specifically illustrated in FIG. 1 can also form a part of digital image 200.

In certain embodiments, digital image 200 includes image data 210 which define a digital image to which a digital imaging effect may have been applied. Such data may be saved in any of a wide variety of standardized or proprietary formats, including compressed or uncompressed formats, as well as rasterized or vector formats. For instance, in certain embodiments the digital imaging effect methodologies disclosed herein can be applied to digital images saved using the JPEG, TIFF, GIF, BMP, PNG, PSD or PSB formats. However, the claimed invention is not intended to be limited to any particular digital imaging file format, and therefore the systems and methods disclosed herein can also be used with other existing or subsequently developed file formats in other embodiments.

Digital image 200 also optionally includes image effect data 220 that specify one or more digital imaging effects which have been applied to the image defined by image data 210. As set forth above, effect data 220 can be incorporated into a single image file with image data 210, or can be provided in a separate file which is processed together with the file containing image data 210. For example, in one embodiment image effect data 220 are separately provided in a text-based file designed for human-readable data exchange, such as a JavaScript Object Notation (JSON) file containing one or more name-value pairs. Image effect data 220 include information that enables one or more effects to be applied a digital image. For example, where a +67% saturation adjustment effect has been applied to the digital image defined by image data 210, image effect data 220 can contain information specifying a corresponding +67% saturation adjustment. This advantageously allows a recipient of digital image 200 to extract effect data 220 and apply such extracted data to other images without having to appreciate or understand the technical details of how a particular imaging effect is achieved. Image effect data 220 can optionally specify multiple effects, and/or can specify one or more secondary parameters that further define the effect or effects which are to be applied. In certain embodiments image effect data 220 can be configured for use by a particular digital imaging tool that is to be used to apply the specified effect or effects. By way of example, the following JSON file includes image effect data including name-value pairs that specify particular adjustments to the saturation, contrast and exposure of a digital image:

```
{
    "name": "My Recipe",
    "blocks":
    [
        {
            "kind": "image",
            "ref": "implicit:base"
        },
        {
            "kind": "improve",
            "saturation": 0.666667,
            "contrast": 0.613333,
            "exposure": 0.082221
        }
    ]
}
```

In certain embodiments digital image 200 also optionally includes tag data 230 that specify additional information associated with effect data 220. As set forth above, tag data 230 can be incorporated into a single image file with image data 210 and effect data 220, or can be provided in a separate file which is processed together with other components of digital image 200. For example, in one embodiment tag data 230 are included as additional name-value pairs provided in a JSON file that also includes effect data 220, and that is provided separately from a file containing image data 210. For instance, tag data 230 may contain information specifying a particular digital imaging tool that is to be used to apply the effects specified in effect data 220. Tag data 230 may additionally or alternatively include hyperlinks or other information that can be used to access, purchase or otherwise obtain the digital imaging tool to be used to apply the effects specified in effect data 220; such information may be useful if an image recipient does not have access to the tool that is intended for use with effect data 220. In still other embodiments tag data 230 can include social networking data, such as hyperlinks to data hosted by social networking data server 600, and that indicate the frequency with which a particular imaging effect is shared, or the identity of users who have shared a particular imaging effect. In still other embodiments, any other suitable data appropriate for sharing with digital image 200 can be included in tag data 230.

Figure 2:
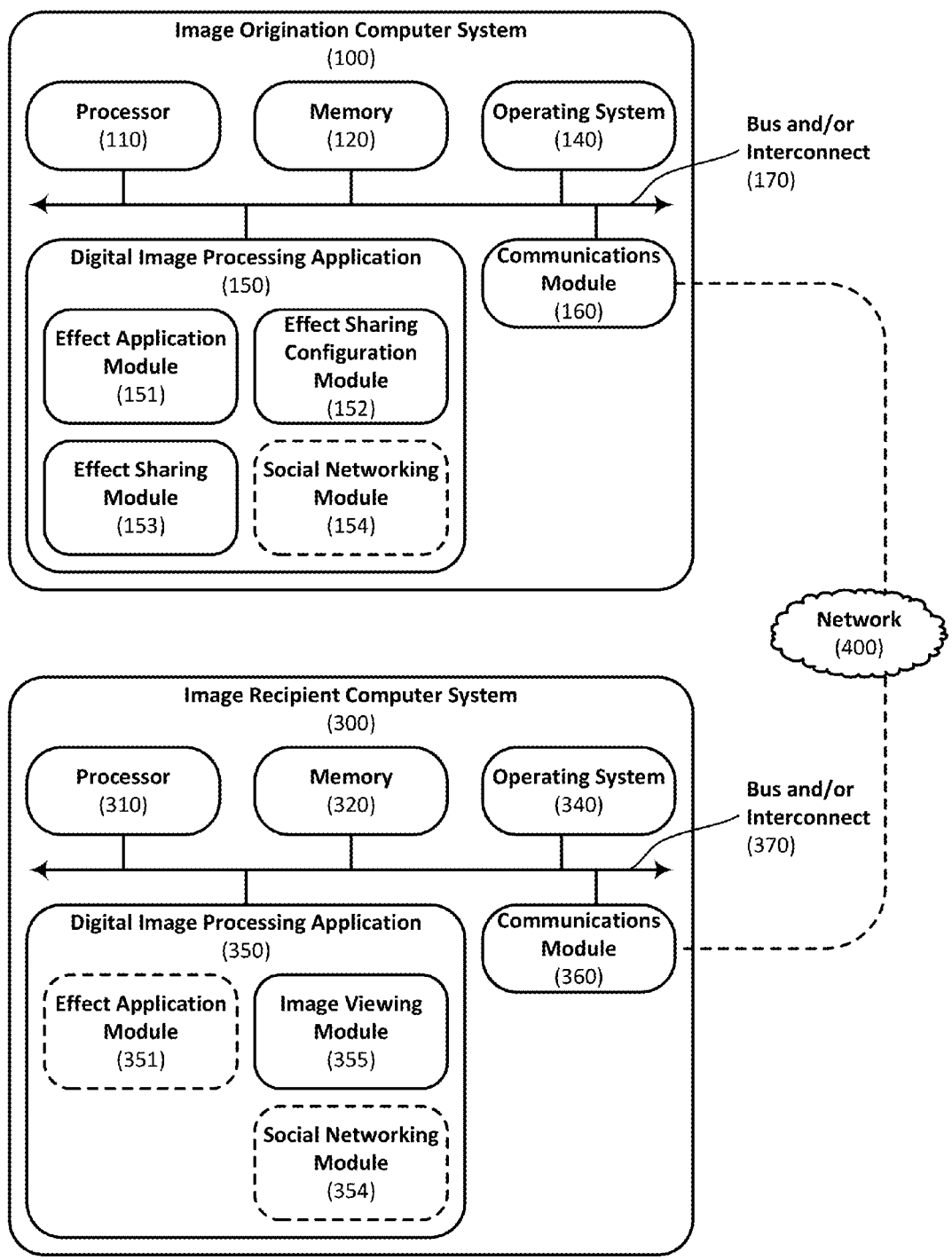
FIG. 2 is a block diagram schematically illustrating selected components of a system that can be used to share a digital imaging effect in accordance with certain embodiments of the present invention.

As illustrated FIG. 1, digital image 200 is communicated between an image origination computer system 100 and an image recipient computer system 300 via network 400. FIG. 2 is a block diagram schematically illustrating selected components of example computer systems 100, 300 that can be used to share a digital imaging effect in accordance with certain embodiments of the present invention. Computer systems 100, 300 may comprise, for example, one or more devices selected from a desktop or laptop computer, a workstation, a tablet, a smartphone, a set-top box or any other such computing device. A combination of different devices may be used in certain embodiments. Computer systems 100, 300 of this example embodiment each include, among other things, a processor 110, 310, a memory 120, 320, an operating system 140, 340, a digital image processing application 150, 350, and a communications module 160, 360. As can be further seen, a bus and/or interconnect 170, 370 is also provided to allow for intra-device communications using, for example, communications module 160, 360. As described above, computer systems 100, 300 are coupled to a network 400 to allow for communications with each other, as well as with other computing devices such as application server 500 and social networking data server 600. Other componentry and functionality not reflected in the illustrations will be apparent in light of this disclosure, and it will be appreciated that the claimed invention is not intended to be limited to any particular hardware configuration.

Processors 110, 310 can be any suitable processors, and may include one or more coprocessors or controllers, such as a graphics processor, to assist in control of computer systems 100, 300. Memory 120, 320 can be implemented using any suitable type of digital storage, such as one or more of a disk drive, a universal serial bus (USB) drive, flash memory and/or random access memory (RAM). Operating systems 140, 340 can be implemented with any suitable operating system, but in some example embodiments are implemented with Google Android, Linux, Microsoft Windows, or Apple OS X. As will be appreciated in light of this disclosure, the techniques provided herein can be implemented on any such platforms. Communications modules 160, 360 can be any suitable network chip or chipset which allows for wired and/or wireless communication to network 400 so that computer systems 100, 300 can communicate with other local and/or remote computing systems and/or servers. Network 400 may be a local area network (such as a home-based or office network), a wide area network (such as the Internet) or a combination of such networks, whether public, private or both. In some cases, access to resources on a given network or computing system may require credentials such as usernames, passwords and/or any other suitable security mechanism.

Digital image processing applications 150, 350 are configured to provide information to, and to receive information and commands from, a user. These applications 150, 350 can be implemented with or otherwise used in conjunction with a variety of suitable input/output hardware devices that are coupled to or that otherwise form a part of the respective computer systems 100, 300. Examples of such input/output hardware devices include a display, a textual input device such as a keyboard and a pointer-based input device such as a mouse. Other input/output devices that may be used in other embodiments include a touchscreen, a touchpad, a speaker and/or a microphone. In certain embodiments, one or more of applications 150, 350 are installed local to the respective computer systems 100, 300, as shown in the example embodiment of FIG. 2. Alternatively, computer systems 100, 300 can be implemented in a client-server arrangement wherein at least a portion of the functionality of applications 150, 350 is provided to the respective computer systems 100, 300 using an applet, such as a JavaScript applet, or other downloadable module. Such a remotely accessible module can be provisioned in real-time in response to a request from one of computer systems 100, 300 for access to a given server having resources that are of interest to the user of the respective computer system.

For example, a first user of a tablet computer who is acting as a content originator may invoke digital image processing application 150 upon accessing a cloud-based repository of images and/or other content that the first user wishes to share. Alternatively a second user of a smartphone who is acting as a content recipient may invoke digital image processing application 350 upon receiving a hyperlink that provides access to the same cloud-based repository of images and/or other content that the second user wishes to browse. In either case, the cloud-based repository can be local to network 400 or can be remotely coupled to network 400 by one or more other networks and/or communication channels. However, it will be appreciated that in any such stand-alone or networked computing scenarios, digital image processing applications 150, 350 can be implemented with any suitable interface technologies that allow users to interact with their respective computer systems 100, 300.

Still referring to the example embodiment illustrated in FIG. 2, image origination computer system 100 includes digital image processing application 150 which, in certain embodiments, is specifically configured for use by an image originator. For example, this application 150 may include an effect application module 151 which is configured to apply an effect to a digital image. As described previously, a digital imaging effect is the result of a processing technique that adjusts the graphical attributes of the individual pixels that comprise a digital image in a way that produces a particular visual effect. Examples of digital imaging effects include hue adjustments, contrast adjustments, sharpness adjustments, brightness adjustments, gamma correction, blurring effects, warping effects, diffusion filters and edge enhancements. Certain effects can be applied uniformly across an entire image, while other effects can be applied only to certain regions of an image, such as to the perimeter of an image or to a user-specified area. In addition, certain effects can be applied based on parameters which are predefined, fixed or otherwise provisioned by default, while other effects can be applied based on user-configurable parameters. A digital imaging effect can be applied to a digital image in an edit operation that is performed by a digital imaging processing application. Examples of software tools that can be used to provide the functionality associated with effect application module 151 include, but are not limited to, Adobe Photoshop, Adobe Edge Reflow, GNU Image Manipulation Program (GIMP), Corel Paint Shop and Microsoft Paint. It will be appreciated that the claimed invention is not intended to be limited to use with any particular digital imaging effect or software tool used to generate such effects.

In certain embodiments digital image processing application 150 further includes an effect sharing configuration module 152 and an effect sharing module 153. Effect sharing configuration module 152 can be used to define how a digital imaging effect is to be shared from an image originator to an image recipient. For example, if a blurring effect, a brightness adjustment and an edge enhancement effect have been applied to a selected digital image, the image originator can use effect sharing configuration module 152 to specify that only the blurring effect and the brightness adjustment are to be shared to an image recipient. Effect sharing configuration module 152 can use any appropriate user interface element or elements to receive such configuration settings from the image originator and to provide the image originator with information regarding how the imaging effects are to be shared, if at all. Once effect sharing configuration module 152 is used to define which effect or effects, if any, are to be shared, effect sharing module 153 can be used to generate the previously described effect data 220 that define the effects which are to be shared. For example, in certain embodiments effect sharing module 153 can be used to generate a JSON file which includes effect data 220 and which is sent with image data 210 to an image recipient, as described above. While use of effect sharing configuration module 152 advantageously provides the image originator with greater control over how particular effects are shared, it will be appreciated that the configuration module 152 is optional and therefore is optionally omitted, for example in embodiments wherein the effect sharing parameters are hardcoded, predefined or otherwise provisioned by default.

Digital image processing application 150 optionally includes a social networking module 154 which can be used to manage social networking aspects of an effect sharing operation. As described above, in certain embodiments tag data 230 include social networking data, such as hyperlinks to data hosted by social networking data server 600, and that indicate the frequency with which a particular imaging effect is shared or the identity of users who have shared a particular imaging effect. Social networking module 154 can be used to manage such functionality, such as by providing a user interface that presents data retrieved from data server 600 and allows an image originator to manage the collection and aggregation of such data. For example, in certain embodiments the image originator can use social networking module 154 to activate tracking of data relating to how a particular imaging effect is shared among a community of users, such that recipients of that effect could be identified and/or tallied. As another example, social networking module 154 could also be used to keep track of network locations of images to which a previously-shared effect has been applied. Thus social networking data server 600 advantageously allows an image originator to leverage the power of social networking tools to evaluate how a particular effect is shared in a networked environment.

Referring still to the example embodiment illustrated in FIG. 2, image recipient computer system 300 includes digital image processing application 350 which, in certain embodiments, is specifically configured for use by an image recipient. This application 350 optionally includes an effect application module 351 having functionality similar to that of effect application module 151 described above with respect to image originator. In embodiments where the image recipient wishes to apply the received effect data 220 to other images, such as images stored in memory 320 of image recipient computer system 300, effect application module 351 can be used for this purpose. In certain embodiments effect application module 351 can be configured to apply the effects defined by effect data 220 directly to an identified target image. However in other embodiments effect application module 351 can be configured to apply such effects selectively or variably based on user-adjustable parameters. For example, where effect data 220 define a blurring effect, a brightness adjustment and an edge enhancement effect, the image recipient can use effect application module 351 to select only the brightness adjustment to be applied to the target image. Even where the image recipient does not directly apply the received effect data 220 to a target image, simply providing the image recipient with information regarding which effects were previously applied to a received image, as well as how such effects were applied, can greatly assist the image recipient in understanding how a given imaging effect can affect the appearance of a digital image.

As another example, where effect data 220 define a +67% saturation adjustment, the image recipient can optionally use effect application module 351 to modify this effect such that a +50% saturation adjustment is instead applied to the target image. This can be accomplished, for example, by displaying a user interface provided by effect application module 351 that can be used to adjust one or more parameters upon which the effect is based. For example, where digital image processing application 350 includes a user interface having slider elements to control hue, saturation and luminosity, effect application module 351 can be configured to manipulate those sliders into adjusted positions based on the received effect data 220. This advantageously allows the image recipient to not only see the mechanics of how a particular imaging effect was achieved, but also allows the recipient to further manipulate the effect itself by, for example, adjusting a +67% saturation adjustment to a +50% saturation adjustment.

In other embodiments effect application module 351 is optional and can be omitted, such as in the case where image recipient computer system 300 comprises a device having limited image processing capabilities, such as certain smartphones. In embodiments wherein effect application module 351 is omitted, the image recipient can save received effect data 220 in memory 320, from which they can be subsequently accessed and/or transmitted to another device having more robust image processing capabilities. In such cases digital image processing application may optionally include an image viewing module 355 which can still allow the image recipient to view and/or extract effect data 220 from a received digital image 200, even if such a module lacks image modification functionality. In embodiments that include effect application module 351, the functionality of image viewing module 355 is optionally provided by effect application module 351.

Digital image processing application 350 optionally includes a social networking module 354 which can be used to access social networking functionality related to the imaging effect that is shared between an image originator and an image recipient. Thus social networking module 354 associated with image recipient computer system 300 can provide functionality that complements the functionality provided by social networking module 154 associated with image origination computer system 100. For example, module 354 can be configured to provide an image recipient with links to data hosted by social networking data server 600 that indicates the frequency with which a particular imaging effect has been shared previously or the identity of users who have shared a particular imaging effect. Social networking module 354 is also optionally configured to enable the image recipient to further share a particular imaging effect via other social networking assets accessible via network 400, such as the image recipient's Facebook or Twitter account. This allows the image recipient to extend his/her social experience from a one-to-one interaction with image originator to a multifaceted interaction with a community of users interacting with a particular digital imaging functionality.

As will be appreciated in light of this disclosure, the various components and modules of the disclosed system, such as digital image processing applications 150, 350, can be implemented in software, such as a set of instructions encoded on a suitable computer readable medium, that when executed by one or more processors, cause the various methodologies provided herein to be carried out. The instructions can be encoded using a suitable programming language, such as C, C++, object-oriented C, JavaScript or BASIC, or alternatively, using custom or proprietary instruction sets. The computer readable medium may be a non-transitory storage medium suitable for storing digital information, such as a hard drive, a server, flash memory and/or random access memory. In alternative embodiments, the components and/or modules can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the functionality described herein. It will be apparent that any suitable combination of hardware, software and firmware can be used.

User Interface

Figure 3A:
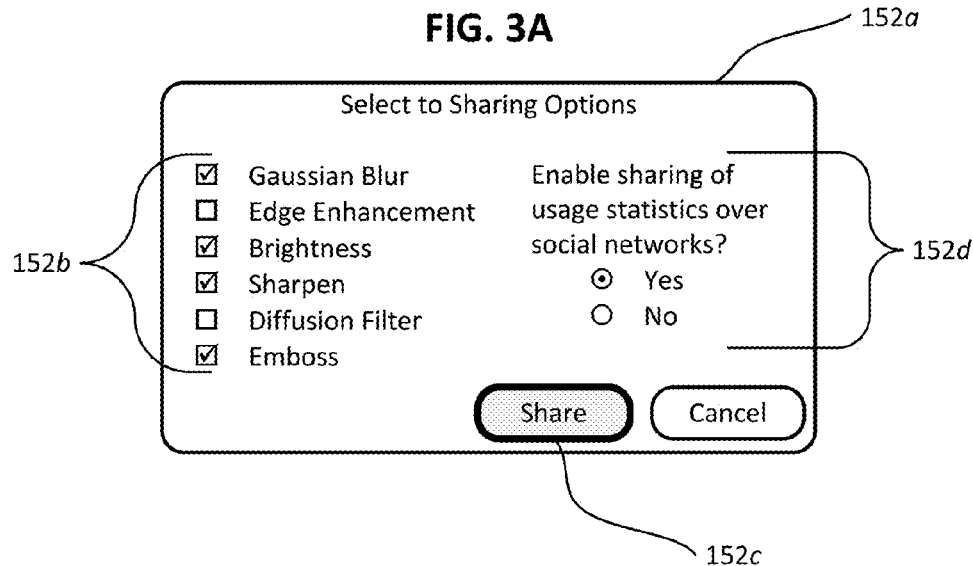
FIG. 3A illustrates an example user interface that can be used to configure how data associated with a digital image is to be shared by an image originator in accordance with certain embodiments of the present invention.

FIG. 3A illustrates an example user interface that can be used to configure how data associated with a digital image is to be shared by an image originator in accordance with certain embodiments of the present invention. In certain embodiments user interface element 152a is generated by effect sharing configuration module 152 illustrated in FIG. 2. For example, in one embodiment effect sharing configuration module 152 is configured to generate user interface element 152a in response to a command submitted to digital image processing application 150 by image originator. Examples of such a command include a command to save, send or otherwise share an image to which a digital imaging effect had previously been applied. It will be appreciated that in embodiments wherein the effects to be shared are hard-coded, predefined or are otherwise provisioned by default, the user interface illustrated in FIG. 3A may simply be used to provide non-interactive information regarding which effect or effects will be available for sharing, or alternatively, may be omitted altogether.

In certain embodiments, element 152a provides the image originator with a list of digital image processing effects which may be available for sharing. For example, user interface element 152a illustrated in FIG. 3A indicates that a Gaussian blur effect, an edge enhancement effect, a brightness adjustment, a sharpening adjustment, a diffusion filter effect and an embossing effect are available for sharing. In such embodiments, the image originator can select effects and/or adjustments which are to be shared using checkboxes 152b. Thus, in the example embodiment of FIG. 3A, the image originator has elected to share a Gaussian blur effect, a brightness adjustment, a sharpening adjustment and an embossing effect. In certain embodiments effects which are not available for sharing are displayed but indicated as inactive by, for example, greyed text. It will be appreciated that user interface elements other than checkboxes can be used to enable an image originator to select effects which are to be shared in other embodiments, and that the present invention is not intended to be limited to any particular user interface elements. User interface element 152a also provides the image originator with the option of enabling the sharing of usage statistics over social networks, for example with radio buttons 152d. After the image originator is satisfied with the selected sharing options, he/she can proceed with the effect sharing via the use of an acceptance button such as "Share" button 152c illustrated in FIG. 3A.

Figure 3B:
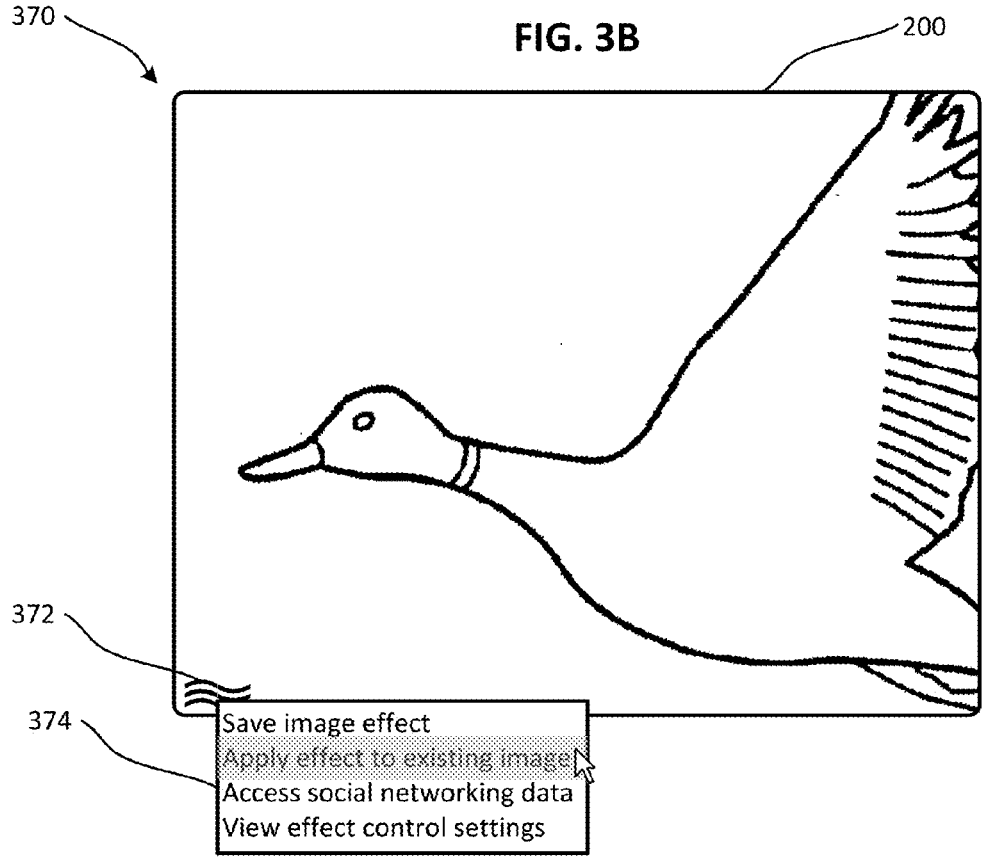
FIG. 3B illustrates an example user interface that can be used to manipulate data associated with a received digital image in accordance with certain embodiments of the present invention.

FIG. 3B illustrates an example user interface that can be used to manipulate data associated with a received digital image in accordance with certain embodiments of the present invention. In certain embodiments user interface 370 is generated upon receipt of digital image 200 from image originator. User interface 370 can be generated by digital image processing application 350, and in particular by one or more modules such as effect application module 351 and/or image viewing module 355. User interface 370 can be configured to display the received digital image 200, as well as an indicator 372 that indicates that effect data 220 are associated with the displayed digital image 200. In one embodiment, such as illustrated in FIG. 3B, indicator 372 is an icon or watermark displayed over a selected corner of digital image 200. In other embodiments indicator 372 can be positioned elsewhere, such as in a toolbar, a floating popup window, a menu bar or the like. However, regardless of the details of how indicator 372 is displayed, it will be appreciated that the presence of indicator 372 informs the image recipient that effect data 220 may be extracted from a received digital image 200. This can be particularly useful, for example, in a situation where a large collection of images is shared from image originator to image recipient. In such case the image recipient can quickly browse through the received images and identify which images are associated with effect data based on the presence of indicator 372. Likewise, a user viewing images posted on social networking sites such as Facebook or Tumblr, or distributed through messaging services such as Twitter, can readily recognize indicator 372 in a viewed image and appreciate that the processed appearance of that image is available for extraction. In certain embodiments hovering a selection indicator such as a mouse pointer over indicator 372 causes a popup window to appear; such a window can be used to convey additional information to the user regarding the functionalities provided herein; one example of such information is a message stating "Make my image look like this with one click."

In the example embodiment illustrated in FIG. 3B, selecting indicator 372 causes a context menu 374 to be displayed. Indicator 372 can be selected by, for example, clicking thereon with a mouse, keying a shortcut combination using a keyboard, issuing a spoken command using a voice recognition system, or the like. Context menu 374 contains one or more menu options relating to data included within or otherwise associated with digital image 200. Menu options are also referred to herein as "use options" since they may not necessarily be presented in a menu format. Functionality associated with certain example menu options is described in turn. However in other embodiments the particular menu options provided in context menu 374 depend on data provided in tag data 230, as described above. It will be appreciated that the example menu options illustrated in FIG. 3B are not intended to be required or limiting, and that fewer or additional menu options and functionalities can be accessed via context menu 374 in other embodiments.

For example, in one embodiment context menu 374 includes a "Save image effect" menu option which can be invoked to save effect data 220 for future use. Such effect data 220 can be saved in memory 320, or may be transmitted via network 400 to another computing device, such as a computing device with more robust digital image processing functionality. For instance, in one embodiment selecting the "Save image effect" menu option causes a dialog box to be opened prompting the image recipient to specify a location where the received effect data 220 should be saved. Allowing the image recipient to save effect data 220 advantageously enables him/her to apply a received digital imaging effect to multiple images, or to manipulate effect data 220 such that the effect that is ultimately applied to the target image is different to some extent from the effect applied to digital image 200 received from the image originator. Manipulation of effect data 220 can be accomplished using a digital image processing application, or by simply editing a file containing such data, such as the aforementioned JSON file.

Figure 3C:
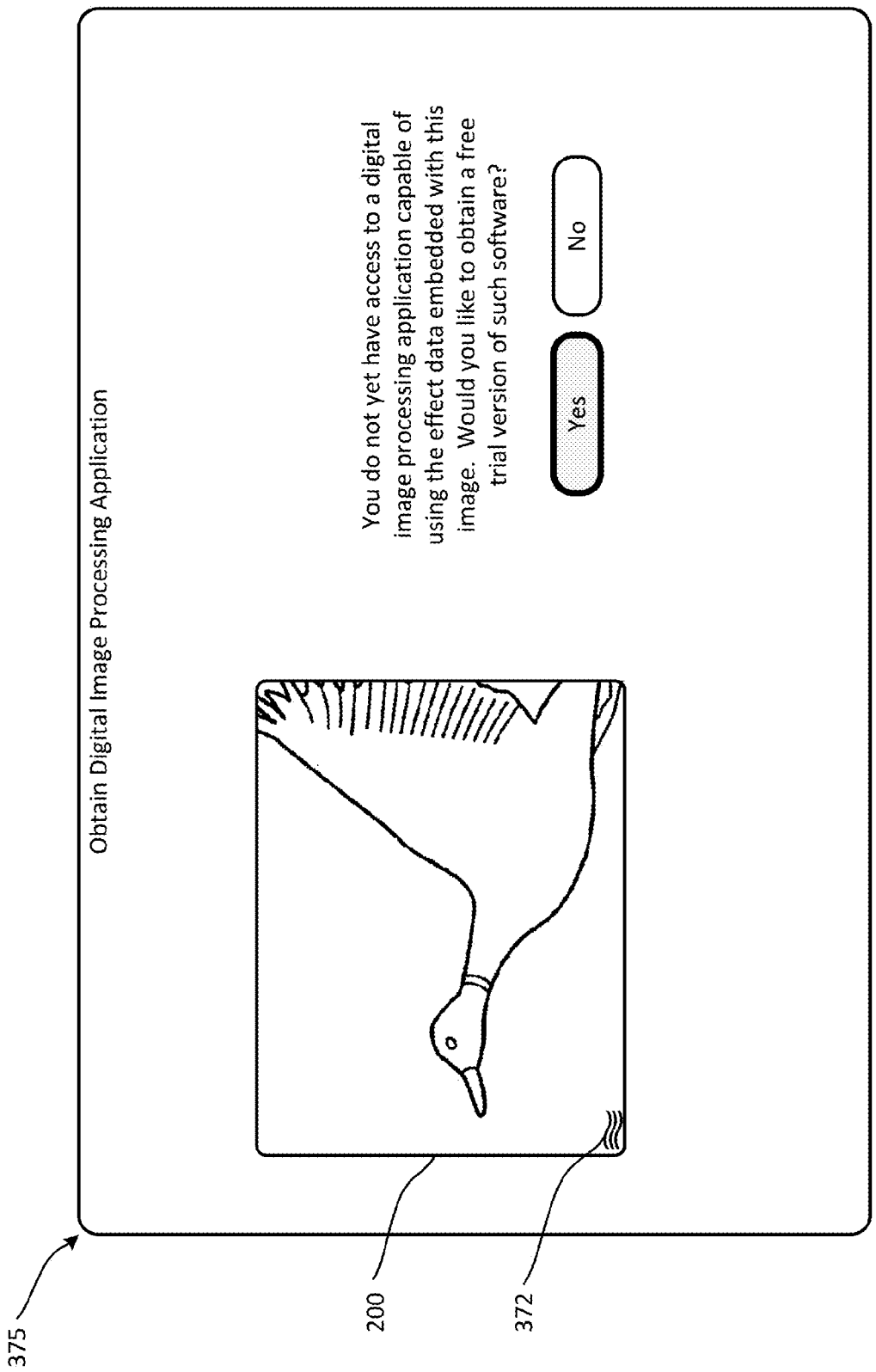
FIG. 3C illustrates an example user interface that can be used to provide access to a digital image processing software application associated with image effect data received from an image recipient in accordance with certain embodiments of the present invention.

Still referring to FIG. 3B, context menu 374 may also include an "Apply to existing image" menu option which can be invoked to apply a digital image processing effect defined by effect data 220 to another image associated with image recipient, such as an image saved in memory 320. The second image to which effect data 220 is to be applied is referred to herein as the "target image". Where effect data 220 define multiple effects which may have been applied to digital image 200, an "Apply to existing image" menu option can be configured to automatically apply all such effects to a target image, or can be configured to prompt the image recipient to select which effects should be applied to a target image from amongst several available effects. If the image recipient does not have access to a digital image processing application that is compatible with the received effect data 220, selecting "Apply to existing image" menu option can be configured to redirect the image recipient to an application server that can provide the application or a trial version of the application. In this case the image recipient can be provided with a message indicating that a trial version is available, such as provided in the user interface 375 illustrated in FIG. 3C.

Figure 3D:
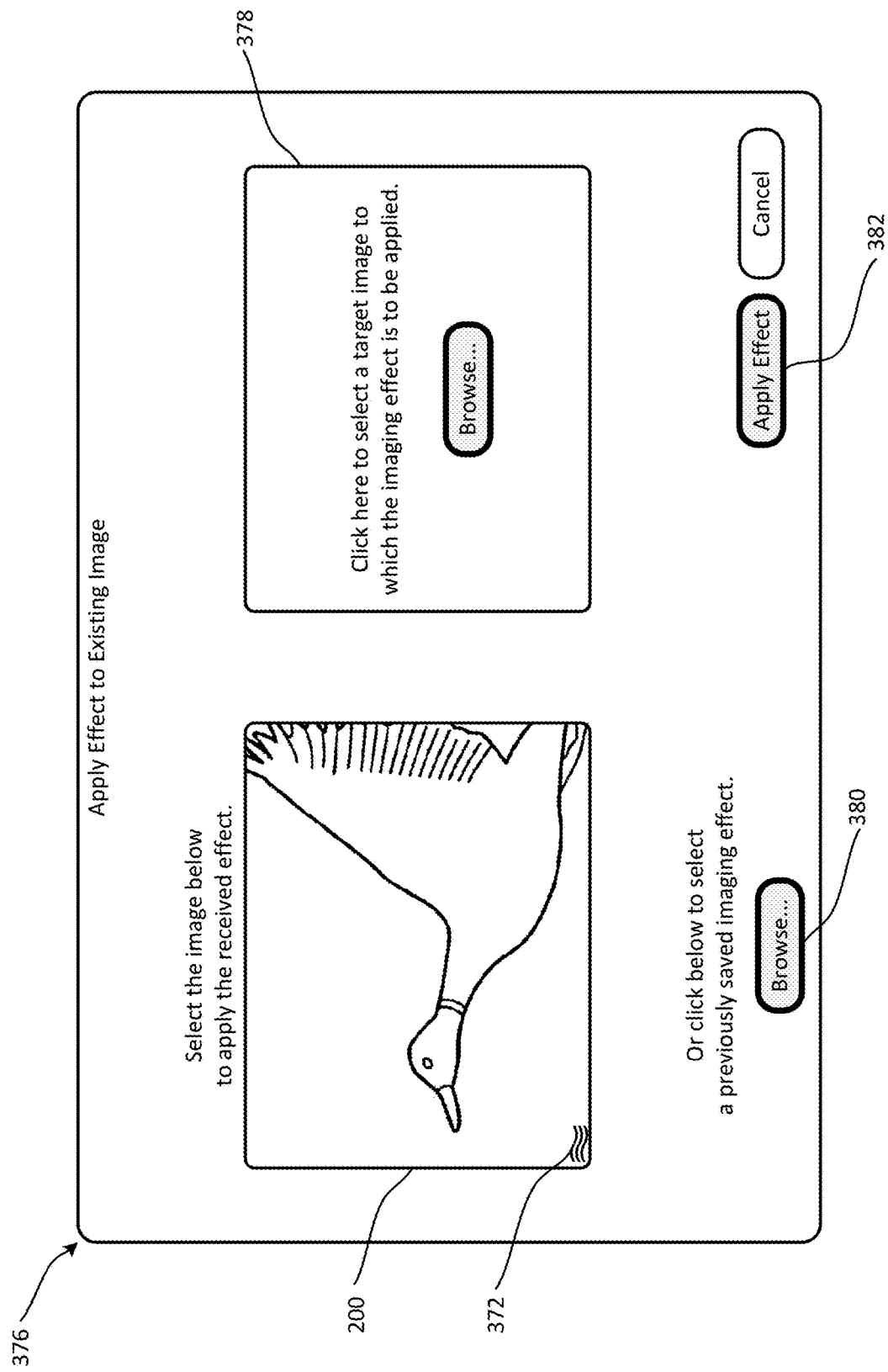
FIG. 3D illustrates an example user interface that can be used to apply a digital imaging effect to an image that is saved or otherwise available on an image recipient computer system in accordance with certain embodiments of the present invention.

FIG. 3D illustrates an example user interface 376 that can be used to apply a digital imaging effect to an image that is saved or otherwise available on image recipient computer system 300 in accordance with certain embodiments of the present invention. User interface 376 can be accessed, for example, by selecting the "Apply to existing image" menu option illustrated in FIG. 3B. In this example embodiment, user interface 376 provides the image recipient with an image selection dialog box 378 that allows the image recipient to select a target image to which the received digital imaging effect is to be applied. User interface 376 may optionally provide the image recipient with the option to apply previously saved effect data 220 to the selected target image; such functionality can be accessed, for example by invoking a file browser 380 that allows the user to identify the previously saved effect data 220 which is to be applied. Once the user selects the imaging effect to be applied and the target image, "Apply Effect" button 382 can be used to complete the operation. In certain embodiments the modified target image is displayed in dialog box 378 such that the received image and the processed target image can be viewed in a side-by-side fashion.

Referring again to FIG. 3B, context menu 374 also optionally includes an "Access social networking data" menu option which can be invoked to access social networking functionality related to the imaging effect that is shared between an image originator and an image recipient.

Figure 3E:
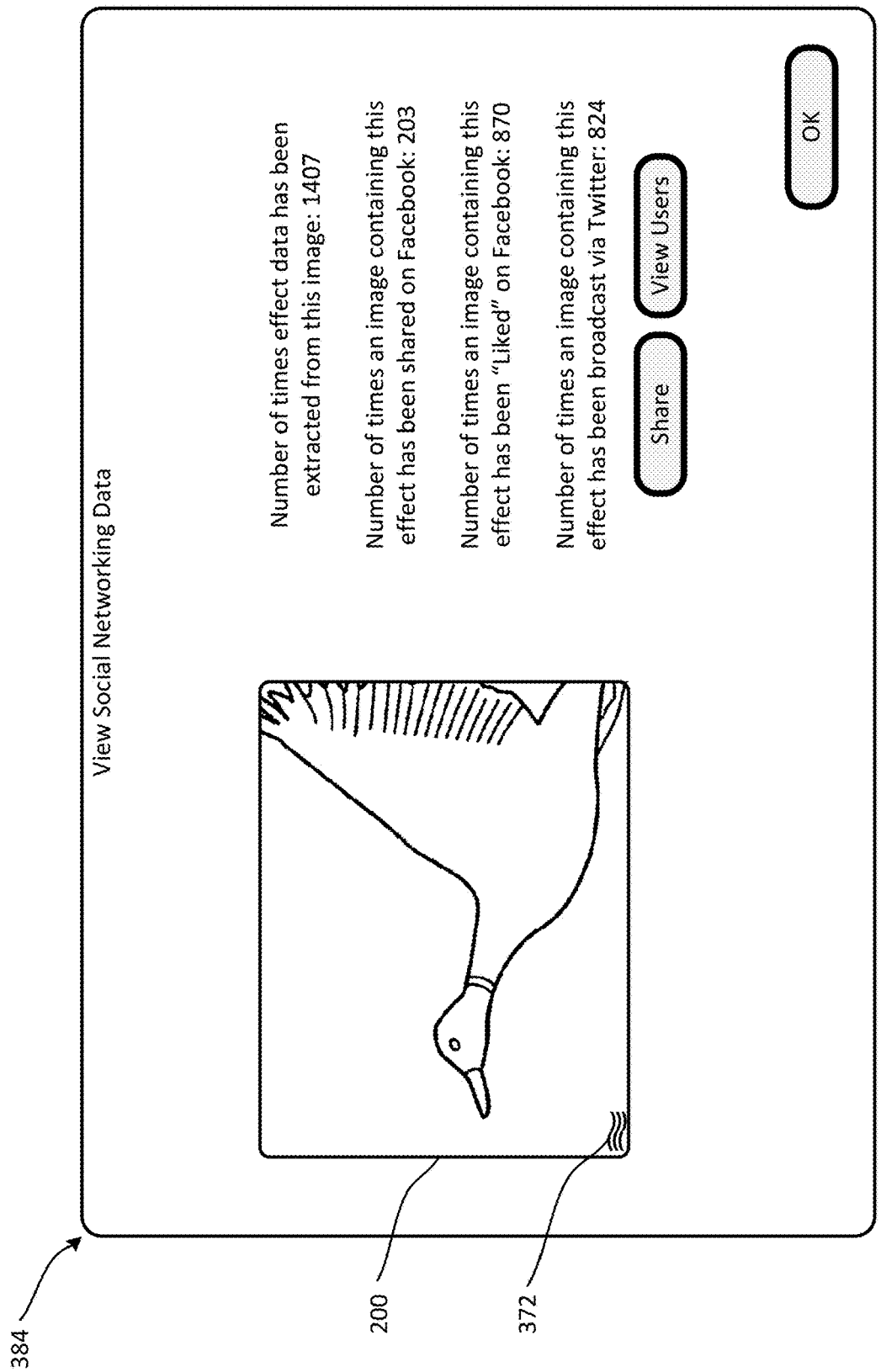
FIG. 3E illustrates an example user interface that can be used to provide social networking data associated with a digital imaging effect in accordance with certain embodiments of the present invention.

Such functionality can be provided, for example by social networking module 354, and can leverage resources provided by social networking data server 600. Thus invoking such a menu option can provide the image recipient with links to data indicating, for example, the frequency with which a particular imaging effect has been shared previously, or the identity of users who have shared a particular imaging effect. Invoking such a menu option can also provide the image recipient with links to other social networking functionality, such as the ability to further share a particular imaging effect via, for example, the image recipient's Facebook or Twitter account. FIG. 3E illustrates an example user interface 384 that can be used to provide such information and functionality.

Context menu 374 may also include a "View effect control settings" menu option which can be invoked to view and/or manipulate control settings associated with a digital imaging effect. FIG. 3F illustrates an example user interface 386 providing such functionality. Specifically, user interface 386 includes one or more sliders 388 that can be used to indicate and/or manipulate parameters that are adjusted based on effect data 220. For instance in the example embodiment illustrated in FIG. 3F, sliders 388 indicate a hue adjustment, a saturation adjustment and a luminosity adjustment. This not only provides the image recipient with information indicating how the image originator achieved the shared effect in the first place, but it also allows the image recipient to further manipulate the effect. The image recipient may save the received effect, optionally including additional modifications, using "Save Effect" button 390.

Methodology

Figure 4A:
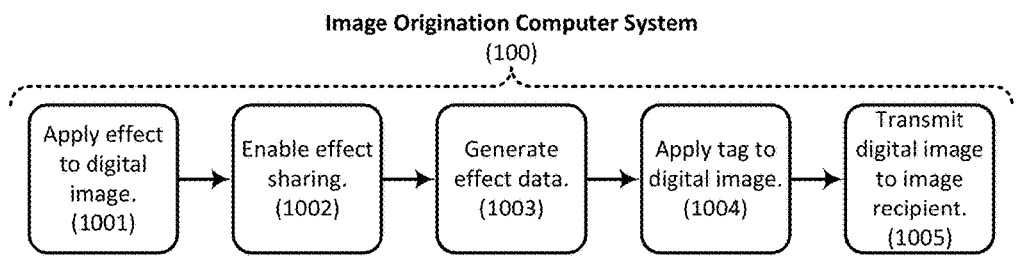
FIG. 4A is a flowchart illustrating an example technique for generating a digital image from which a digital imaging effect can subsequently be extracted by an image recipient, in accordance with certain embodiments of the present invention.
Figure 4B:
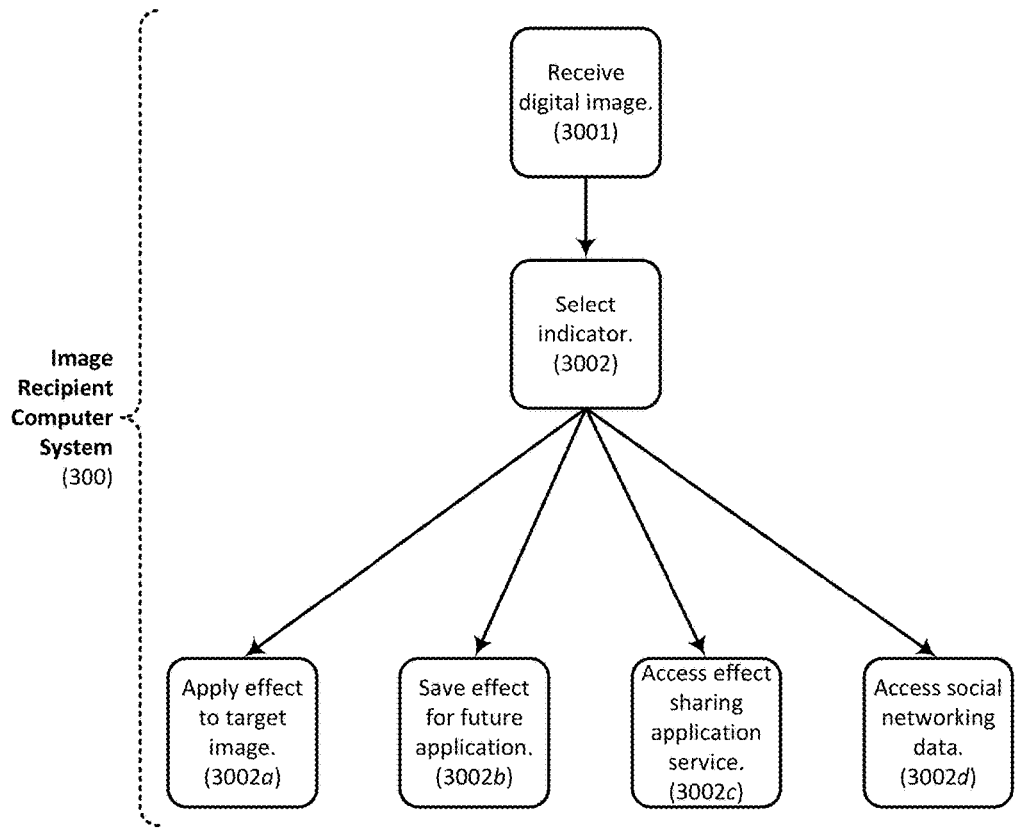
FIG. 4B is a flowchart illustrating an example technique for extracting a digital imaging effect from a received digital image, in accordance with certain embodiments of the present invention.

FIG. 4A illustrates an example technique for generating a digital image from which a digital imaging effect can subsequently be extracted by an image recipient, in accordance with certain embodiments of the present invention. Likewise, FIG. 4B illustrates an example technique for extracting a digital imaging effect from a received digital image, in accordance with certain embodiments of the present invention. As can be seen, these example methodologies include a number of phases and sub-processes, the sequence of which may vary from one embodiment to the next. However, when considered in the aggregate, these phases and sub-processes form a complete digital imaging effect sharing function that is responsive to user commands in accordance with certain of the embodiments disclosed herein. This methodology can be implemented, for example, using the system architecture illustrated in FIGS. 1 and 2, as well as the user interface elements illustrated in FIGS. 3A through 3F, as described above. However, other system architectures and user interfaces can be used in other embodiments, as will be apparent in light of this disclosure. To this end, the correlation of the various functions shown in FIGS. 4A and 4B to specific components and user interface elements shown in FIGS. 1, 2 and 3A through 3F is not intended to imply any structural and/or use limitations. Rather, other embodiments may include, for example, varying degrees of integration wherein multiple functionalities are effectively performed by one system, such as where a single module is used to view and modify a digital image. Thus, other embodiments may have fewer or more modules and/or user interface elements depending on the granularity of implementation. Numerous variations and alternative configurations will be apparent in light of this disclosure.

The digital image generation methodology illustrated in FIG. 4A commences with applying 1001 an effect to a digital image. This can be accomplished, for example, using effect application module 151 of digital image processing application 150 provided with image originator computer system 100. In certain embodiments multiple effects may be applied to the digital image. When the image originator decides that the digital image is to be shared with an image recipient, he/she enables 1002 effect sharing. This can be accomplished, for example, by issuing a command via a toolbar, menu bar, context menu, keyboard shortcut or the like. In certain embodiments effect sharing configuration module 152 generates a user interface element, such as user interface element 152a, which can be used to further define how the one or more digital image processing effects are to be shared with image recipient. Based on such configuration—or alternatively based on a configuration that is predefined, hardcoded or otherwise provisioned by default—effect sharing module 153 then generates 1003 effect data 220 that define the one or more effects which are to be shared between the image originator and the image recipient.

In certain embodiments digital image processing application 150 optionally applies 1004 tag data 230 to digital image 200. As described above, tag data 230 may include a wide variety of additional information associated with the digital image processing effects which are to be shared between the image originator and the image recipient. For example, tag data 230 may contain information specifying a particular digital imaging tool that is to be used to apply the effects specified in effect data 220. Such data may be used by the image recipient to facilitate the process of applying the effect data to the target image, or for locating an appropriate digital image processing application capable of applying effect data 220. In such embodiments tag data 230 may be generated by effect sharing module 153. Tag data 230 may additionally or alternatively include social networking data, such as hyperlinks to data hosted by social networking data server 600, and that indicate the frequency with which a particular imaging effect is shared, or the identity of users who have shared a particular imaging effect. In such embodiments tag data 230 may be generated by social networking module 154. In still other embodiments, tag data 230 may be omitted entirely, thus rending their application to the digital image optional. Image origination computer system 100 can then be configured to transmit 1005 digital image 200 to image recipient computer system 300 via network 400. As described above, and as illustrated schematically in FIG. 1, digital image 200 includes one or more of image data 210, effect data 220 and tag data 230.

The imaging effect extraction methodology illustrated in FIG. 4B commences with receiving 3001 digital image 200 from image originator. A module associated with digital image processing application 350, such as effect application module 351 or image viewing module 355, can be configured to display an indicator 372 in conjunction with display of the received digital image 200. By selecting 3002 indicator 372, the image recipient can access a context menu 374 providing a variety of different functionalities. For example, by selecting an "Apply to existing image" menu option, effect application module 351 can be configured to apply 3002a the digital image processing effect defined by effect data 220 to a target image, such as a target image stored in memory 320. By selecting a "save image effect" menu option, a module associated with digital image processing application 350, such as image viewing module 355, can be configured to save 3002b effect data 220 for future application or transmission to another computer system. It will be appreciated that selection of these menu options is not mutually exclusive, and that in certain embodiments an image recipient may first apply the received effect data 220 to an existing image, and then save the same effect data 220 for future application to other images.

As described above, in certain embodiments, effect data 220 are configured to be used with a specific digital image processing application. This configuration helps to ensure that the image recipient will be able to accurately parse and apply effect data 220 when the image recipient has access to the specific digital image processing application, but it can limit functionality when the image recipient does not have access to such an application. In embodiments wherein effect data 220 are configured to be used with a specific digital image processing application, the digital image 200 may include hyperlinks or other information that can be used to access, purchase or otherwise obtain the specific digital image processing application. Such hyperlinks or other information can be provided as part of tag data 230, for example, and can link to an application server 500 that hosts an application sharing service that can provide access to the specific digital image processing application. Thus, in such embodiments, where it is detected that the image recipient does not have access to the specific digital imaging application, such data can enable the image recipient to access 3002*c* the application sharing service hosted by application server 500. Such a service can provide the image recipient with the resources necessary to apply the received effect data 220 to a target image. For example, in one embodiment tag data 230 include a hyperlink to an application server 500 from which the image recipient can obtain a trail version of a digital image processing application that can be used to apply the received effect data 220 to a target image.

As also illustrated in the example embodiment of FIG. 4B, the image recipient can also access 3002*d* social networking data by selecting a corresponding menu option from context menu 374. This allows the image recipient to access social networking functionalities provided by social networking data server 600. For example, the image recipient can use such social networking functionalities to determine the frequency with which a particular imaging effect has been shared previously, or the identity of users who have shared a particular imaging effect. The image recipient can also link the received image—including its embedded effect data—to his/her Facebook or Twitter account. This enables the image recipient to extend his/her social experience from a one-to-one interaction with image originator to a multi-faceted interaction with a community of users interacting with a particular digital imaging functionality.

Conclusion

Numerous variations and configurations will be apparent in light of this disclosure. For instance, one example embodiment provides a computer-implemented method that comprises receiving, at a first computer system, an edit operation associated with a digital image. The edit operation applies a digital imaging effect to the digital image via a first image processing application executable on the first computer system. The method further comprises adding, at the first computer system, an indicator to the digital image. The indicator is configured to provide access to effect data representative of the digital imaging effect so the effect data can be subsequently accessed for application to a target image. In some cases the method further comprises transmitting the digital image to a second computer system, so the effect data can be subsequently accessed for use by a second image processing application executable on the second computer system. In some cases the effect data is combined with image data of the digital image into a single digital image file. In some cases the effect data is included in a JSON file that is associated with a digital image file that contains image data of the digital image. In some cases the effect data defines a plurality of adjustable parameters associated with the digital imaging effect. In some cases the first image processing application is served to the first computer system via an application server computer system, the first image processing application being executable in a browser of the first computer system. In some cases (a) the first image processing application is served to the first computer system via an application server computer system, the first image processing application being executable in a browser of the first computer system; and (b) the indicator is configured with a hyperlink to the application server computer system. In some cases (a) the first image processing application is served to the first computer system via an application server computer system, the first image processing application being executable in a browser of the first computer system; and (b) the application server computer system is capable of tracking a frequency with which the effect data has been shared.

Another example embodiment of the present invention provides a computer-implemented method that comprises receiving, at a first computer system, a digital image including an indicator configured to provide access to effect data representative of a digital imaging effect applied to the digital image. The method further comprises providing access to the effect data at the first computer system via an image processing application, in response to the indicator being selected. In some cases providing access to the effect data includes presenting one or more use options associated with the effect data, the use options including at least one of: (a) extract the effect data and apply the effect data to a target image via the image processing application, the image processing application being executable on the first computer system; and (b) extract the effect data and store the effect data in the first computer system. In some cases providing access to the effect data includes presenting one or more use options associated with the effect data, the use options including, in response to the image processing application not being executable on the first computer system, presenting a prompt allowing for access to the image processing application, wherein the image processing application is accessed via an application server computer system. In some cases the effect data is combined with image data of the digital image into a single digital image file. In some cases the effect data is included in a JSON file that is associated with a digital image file that contains image data of the digital image. In some cases the effect data defines a plurality of adjustable parameters associated with the digital imaging effect. In some cases the image processing application is served to the first computer system via an application server computer system, the image processing application being executable in a browser of the first computer system. In some cases (a) the image processing application is served to the first computer system via an application server computer system, the image processing application being executable in a browser of the first computer system; and (b) the indicator is configured with a hyperlink to the application server computer system. In some cases (a) the image processing application is served to the first computer system via an application server computer system, the image processing application being executable in a browser of the first computer system; and (b) the application server computer system is capable of tracking a frequency with which the effect data has been shared.

Another example embodiment of the present invention provides an image processing system comprising an effect sharing module configured to add an indicator to a first digital image. The indicator is configured to provide access to first effect data that is representative of a digital imaging effect applied to the first digital image via an image processing application executable on a computer system, so the first effect data can be subsequently accessed for application to a first target image. The system further comprises an effect application module configured to provide access to second effect data that is representative of a digital imaging effect applied to a second digital image. The effect application module provides such access via the image processing application. The system further comprises an application server configured to serve at least one of the image processing application, the effect sharing module, and the effect application module to a browser of the computer system. In some cases the effect application module is further configured to present one or more use options associated with the second effect data, the use options including at least one of: (a) extract the second effect data and apply the second effect data to a second target image via the image processing application; and (b) extract the second effect data and store the second effect data in the computer system. In some cases the effect application module is further configured to present one or more use options associated with the second effect data, the use options including, in response to the image processing application not being executable on the computer system, presenting a prompt allowing for access to the image processing application. In some cases the first effect data is included in a JSON file that is associated with a digital image file that contains image data of the first digital image. In some cases the indicator is configured with a hyperlink to the application server. In some cases the application server is capable of tracking a frequency with which the first effect data has been shared.

Another example embodiment of the present invention provides a computer program product encoded with instructions that, when executed by one or more processors, causes a process to be carried out. The process comprises receiving, at a first computer system, an edit operation associated with a digital image. The edit operation applies a digital imaging effect to the digital image via a first image processing application executable on the first computer system. The process further comprises adding, at the first computer system, an indicator to the digital image. The indicator is configured to provide access to effect data representative of the digital imaging effect, so the effect data can be subsequently accessed for application to a target image.

Another example embodiment of the present invention provides a computer program product encoded with instructions that, when executed by one or more processors, causes a process to be carried out. The process comprises receiving, at a first computer system, a digital image including an indicator configured to provide access to effect data representative of a digital imaging effect applied to the digital image. The process further comprises, in response to the indicator being selected, providing access to the effect data at the first computer system via an image processing application.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method comprising:
receiving, at a first computer system, an input corresponding to an identification of a digital image that is associated with metadata that defines a plurality of digital imaging effects applied to the digital image;
receiving a command to save the digital image;
in response to receiving the command to save the digital image, presenting a listing of the digital imaging effects, wherein each listed digital imaging effect is associated with a user interface element that can be toggled between a shared status and an unshared status;
generating shared effect data that is representative of one or more digital imaging effects having a shared status, wherein the shared effect data is generated based on toggle settings of the user interface elements; and
sending the digital image and the shared effect data to a second computer system.

2. The method of claim 1, further comprising adding, by the first computer system, an indicator to the digital image, the indicator configured to provide access to the shared effect data.

3. The method of claim 1, further comprising adding, by the first computer system, an indicator to the digital image, the indicator comprising a code segment that, when executed at the second computer system, causes a digital image viewing application to display a user interface control separately from the digital image, wherein the user interface control is selected from a group consisting of a toolbar, a floating popup window, and a menu bar.

4. The method of claim 1, wherein:
sending the digital image and the shared effect data to the second computer system further comprises sending the digital image and the shared effect data to a server computer system from which they are distributed to the second computer system; and
the server computer system is configured to track a frequency with which the shared effect data is distributed from the server computer system to another computer system.

5. The method of claim 1, wherein the shared effect data identifies an image processing application that was used to apply one of the digital imaging effects having shared status to the digital image.

6. The method of claim 1, wherein the shared effect data defines an adjustable parameter associated with the one of the digital imaging effects having shared status.

7. The method of claim 1, wherein effect data that is representative of a digital imaging effect having unshared status is not sent to the second computer system with the digital image.

8. The method of claim 1, wherein the digital image is a still photograph.

9. An image processing system comprising a processor, a memory coupled to the processor, and a display device coupled to the processor, wherein the memory has encoded thereon instructions that, when executed by the processor, cause an image effect extraction process to be carried out, the image effect extraction process comprising:
receiving, by the image processing system, an input corresponding to an identification of a digital image that is associated with metadata that defines a plurality of digital imaging effects that have been applied to the digital image;
presenting a listing of at least a portion of the digital imaging effects, wherein each listed digital imaging effect is associated with a user interface element that defines whether that effect has a shared status;

generating shared effect data that is representative of one or more digital imaging effects having a shared status; and sending the digital image and the shared effect data to a server computer system.

10. The image processing system of claim 9, wherein the listing of the digital imaging effects is presented in response to receiving the input.

11. The image processing system of claim 9, wherein the image effect extraction process further comprises sending, to the server computer system, an identifier for a user who generated the input.

12. The image processing system of claim 9, wherein the shared effect data defines a region of the digital image to which a particular digital imaging effect was applied.

13. The image processing system of claim 9, wherein the digital image is a still photograph.

14. A non-transitory computer readable medium having instructions encoded thereon that, when executed by one or more processors, causes an imaging effect extraction process to be carried out, the process comprising:

applying, at a first computer system, a digital imaging effect to a digital image via an image processing application executable on the first computer system;

presenting, at the first computer system, a user interface element that is associated with the digital imaging effect, and that can be toggled between a shared status and an unshared status;

in response to the user interface element being toggled to the shared status, generating shared effect data that is representative of the digital imaging effect; and adding, by the first computer system, an indicator to the digital image, the indicator configured to provide access to the shared effect data.

15. The non-transitory computer readable medium of claim 14, wherein the user interface element is presented in response to receipt of a command for the image processing application to save the digital image.

16. The non-transitory computer readable medium of claim 14, wherein the shared effect data defines a region of the digital image to which the digital imaging effect was applied, and further defines an imaging parameter upon which the digital imaging effect is based.

17. The non-transitory computer readable medium of claim 14, wherein the digital image is a still photograph.

18. The non-transitory computer readable medium of claim 14, wherein the imaging effect extraction process further comprises sending the digital image and the shared effect data to a second computer system.

19. The non-transitory computer readable medium of claim 14, wherein the imaging effect extraction process further comprises:

sending the digital image and the shared effect data to a server computer system; and receiving, from the server computer system, an indication that the digital image and the shared effect data has been retrieved from the server computer system by a second computer system.

20. The non-transitory computer readable medium of claim 14, wherein the imaging effect extraction process further comprises:

sending the digital image and the shared effect data to a server computer system; and receiving, from the server computer system, data indicating a number of times that the shared effect data has been applied to another second digital image at another computer system.

* * * * *